Figure 1:
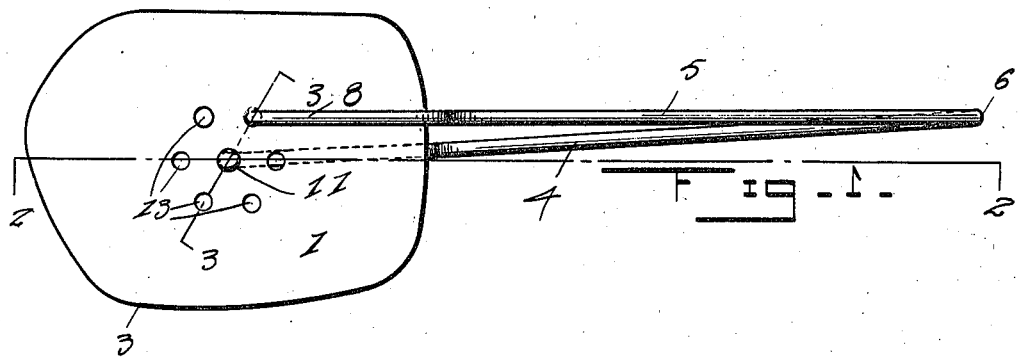

J. C. BATTIGE.
SCRAPER FOR PANS, KETTLES, &c.
APPLICATION FILED MAY 5, 1916.

1,223,238.

Patented Apr. 17, 1917.

Witnesses

Inventor
J.C.Battige.

By
Attorney

UNITED STATES PATENT OFFICE.

JOHN C. BATTIGE, OF MANISTEE, MICHIGAN.

SCRAPER FOR PANS, KETTLES, &c.

1,223,238.　　　　　Specification of Letters Patent.　　Patented Apr. 17, 1917.

Application filed May 5, 1916. Serial No. 95,587.

*To all whom it may concern:*

Be it known that I, JOHN C. BATTIGE, a citizen of the United States, residing at Manistee, in the county of Manistee and State of Michigan, have invented certain new and useful Improvements in Scrapers for Pans, Kettles, &c.; and I do hereby declare the following to be a full, clear, and exact description of the invention, such as will enable others skilled in the art to which it appertains to make and use the same.

The invention relates to improvements in scrapers for pans, kettles and various other receptacles.

The object of the present invention is to improve the construction of scrapers and to provide a simple, practical and comparatively inexpensive device of strong and durable construction designed primarily for cleaning pans, kettles and various other cooking utensils and equipped with an adjustable plate or blade having an irregular form, and capable of adjustment for presenting edges of different configuration to conform to the contour of a pan or other receptacle operated on.

A further object of the invention is to provide a scraper of this character equipped with adjusting and locking means capable of firmly and securely holding the blade in any desired adjustment so that there will be no liability of the blade accidentally slipping and injuring the hand of the operator.

With these and other objects in view, the invention consists in the construction and novel combination of parts hereinafter fully described, illustrated in the accompanying drawing, and pointed out in the claim hereto appended; it being understood that various changes in the form, proportion, size and minor details of construction, within the scope of the claim, may be resorted to without departing from the spirit or sacrificing any of the advantages of the invention.

In the drawing

Figure 2:
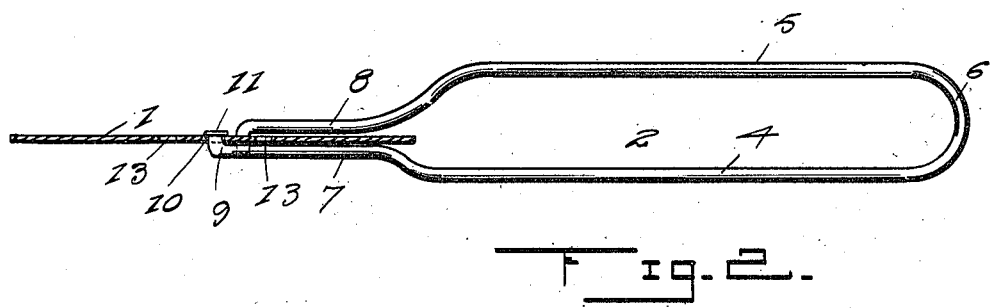
Figure 3:
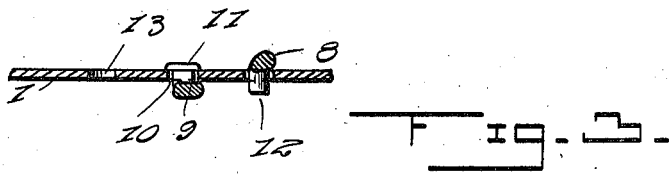

Figure 1 is a plan view of a scraper constructed in accordance with this invention, Fig. 2 is a longitudinal sectional view on the line 2—2 of Fig. 1, Fig. 3 is a detail sectional view on the line 3—3 of Fig. 1.

Like numerals of reference designate corresponding parts in the several figures of the drawing.

In the accompanying drawing in which is illustrated the preferred embodiment of the invention, the pan and kettle scraper comprises in its construction, a plate or blade 1 and a handle 2, the plate or blade being constructed of suitable metal and having an irregular configuration to present a marginal edge 3 having straight and curved portions of different degrees of curvatures to enable the scraper to operate effectively on cooking utensils and various other receptacles for cleaning the same.

The handle 2 which is constructed of stout wire or other suitable material is composed of spaced sides 4 and 5 and the connecting bend 6, the sides 5 being spaced apart a sufficient distance to form a convenient grip or handle. The forward or outer terminal portions 7 and 8 of the sides 4 and 5 are inwardly offset from the said sides 4 and 5 and are fitted against the opposite faces of the plate or blade 1. The straight terminal portion 7 is provided with an integral pivot 9 formed by bending the end of the terminal portion 7 at right angles and arranged in a pivot opening 10 of the plate or blade and secured therein by being headed at 11. The other terminal portion 8 of the side 5 has its ends bent inwardly at right angles to form a lug 12 which is adapted to engage anyone of a series of perforations 13 arranged at intervals and located with relation to the various portions of the irregular edge of the plate or blade for enabling the handle to hold the latter in proper position for operating on various kinds of receptacles for scraping the same interiorly thereof. The resiliency of the handle will maintain the lug 12 in the perforations of the plate and the grip of the operator on the handle in the use of the device will effectually prevent the lug 12 from becoming accidentally disengaged from a perforation of the blade or plate. By this construction there will be no liability of the blade accidentally slipping and injuring the hand of the operator while the device is in use.

What is claimed is:—

A scraper of the class described including a plate of irregular configuration provided with a pivot opening and having a plurality of perforations extending entirely through the plate and a handle composed of spaced sides and a connecting portion, the sides forming a grip and having inwardly offset terminal portions fitted against the plate, one of the terminal portions being bent at an angle to form a pivot, the latter being secured in the pivot opening and the other terminal portion being bent at an angle to form a lug, said lug extending entirely through and adapted to engage any one of the perforations, the pressure of the hand on the handle maintaining the lug in engagement with the perforations.

In testimony whereof I affix my signature in presence of two witnesses.

JOHN C. BATTIGE.

Witnesses:
 F. H. STONE,
 W. E. BROWN.